FIG.5.

INVENTOR.
BERNARD C. EISENBERG
BY Kenyon & Kenyon
ATTORNEYS

June 30, 1970  B. C. EISENBERG  3,517,708
MACHINE AND METHOD FOR TRANSFERRING PREDETERMINED
AMOUNTS OF MATERIAL
Filed March 17, 1967  13 Sheets-Sheet 10

INVENTOR.
BERNARD C. EISENBERG
BY
Kenyon + Kenyon
ATTORNEYS

United States Patent Office 3,517,708
Patented June 30, 1970

3,517,708
MACHINE AND METHOD FOR TRANSFERRING PREDETERMINED AMOUNTS OF MATERIAL
Bernard C. Eisenberg, Rockaway, N.J., assignor to Solbern Corp., Fairfield, N.J., a corporation of Delaware
Filed Mar. 17, 1967, Ser. No. 623,994
Int. Cl. B65b 43/63, 1/36
U.S. Cl. 141—1                                26 Claims

ABSTRACT OF THE DISCLOSURE

The machine and method relating to the establishment of a predetermined amount of material in a receptacle and the transferring of the material in the receptacle to a container. Agitation of the receptacle establishes the predetermined amount of material therein. The receptacle is then available to deliver the predetermined amount of material to a container which, due to its construction, cannot be agitated to control the amount therein during a filling operation. Thus the receptacle becomes an intermediate measuring and transferring device between a source of material and the container or other device to which the material is to be delivered.

BACKGROUND OF THE INVENTION

The field of the invention is machines and methods for establishing a predetermined amount of material and transferring the predetermined amount of material from a source of material to another member such as a container into which the predetermined amount of material is to be filled. Thus, the field of the invention is that of machines and methods for segregating predetermined measured amounts of material from a mass of material and transferring the predetermined amount of material into a container such as a package, can, jar, bag, pouch or the like.

In the prior art, predetermined amounts of material have been transferred to containers by careful weighting of the container and the material after filling and the removal or addition of other material to establish a predetermined weight. In other instances, predetermined amounts of material had been obtained by filling material into a receptacle of known volumetric capacity corresponding to a known weight. The material is then agitated from the receptacle into the container. Again material is added or removed from the receptacle during filling in order to establish the predetermined volume.

Predetermined amounts of material have also been measured by weighing selected weights of material and holding these weights in storage until they can be delivered to the container. Whether weights or volumes are being controlled, the fundamental difficulty is that many materials, due to their extremes in form, cannot readily be placed into or maintained in a condition of uniform density. Consequently, variations in measuring such materials must result.

In addition to the methods and apparatus discussed above, in the prior art it has been standard practice to fill a container completely by hand whereby known volumes or weights of material are first measured out and then transferred by hand into the container.

In the prior art systems requiring manual measuring and transferring, it is obvious that the rate of production is necessarily slow and subject to the errors and waste which usually accompanies manual handling. Systems based upon measuring known weights or volumes are necessarily ones having a time cycle of comparatively long duration so that a high rate of production from a given set of equipment cannot be obtained. Such systems normally do not lend themselves to continuous operation unless a great number of measuring stations are supplied which enable a plurality of filling operations to occur at one time. The accuracy of volumetric and weight measuring systems can be the highest but in many cases such a degree of precision in measuring is totally unnecessary.

Machines which can directly fill a predetermined level of material into a container are often undesirable since they are generally restricted to a single type of material. Machines in which a container is agitated during filling in order to determine the amount of material delivered to the container are often times impractical where the container is incapable of withstanding agitation or the like to control filling. Thus, the prior art systems generally measure the material and then deliver it directly to the container rather than handle the material through some intermediate member as in the invention.

Considerable difficulty has been encountered in filling flexible containers, such as paper-board containers, with a food product and especially containers in which a food product is subsequently subjected to freezing. Flexible containers such as paper-board boxes, bags, pouches and the like often times cannot be filled by the methods and machines for filling rigid cartons such as bottles, jars and cans. In addition, known machines and methods for filling such containers are at a disadvantage due to their complexity and the inexact quantities of food products which are transferred into the packaging container while manual filling limits production and is costly. The necessary result is packages containing varying amounts of material. Where regulations or conditions make it mandatory to fill a minimum amount of material into every container, it has been the practice to place more food product in the container, on the average, than is stated on the label of the container. Only in this way can it be insured that none of the containers are underweight. More precise methods and machine would reduce this economical loss.

SUMMARY OF THE INVENTION

In accordance with the invention, receptacles are conveyed through the machine in a path extending between the receiving station and the discharging station. Adjacent to the receiving station the material is delivered to the receptacles. The receptacles are moved with a predetermined motion in order to agitate the material and thereby establish uniform density of material in the receptacle. At the same time a predetermined volume of material is established in the receptacle and, in view of the uniform density, a predetermined weight of material is obtained. As a result of the agitation any surplus of material is thrown out of the receptacle by the agitating motion. After filling, the receptacle is advanced to the discharge station where the material is transferred from the receptacle to the receiving member. In this way, the agitating motion is applied to the receptacle which is a permanent part of the machine adapted to withstand the force accompanying agitation. Consequently, there is no need to unduly load the container during filling since it is only necessary to deliver the material from the receptacle directly into the container.

Accordingly, an object of this invention is to provide machines for filling containers with a precise amount of material.

Another object of the invention is to segregate a predetermined amount of material from a source thereof and transfer the predetermined amount into a container.

An additional object of the invention is to transfer a predetermined amount of material to a container which is insufficient to withstand rough handling or a degree of movement sufficient to assist in the transfer operation.

A further object of the invention is to fill comparatively non-rigid containers such as bags, pouches, and paper-board or plastic boxes with a predetermined amount of material.

Briefly stated, the present invention comprises a machine including therein receiving and transferring stations. Receptacle means are mounted on a conveyor defining a path which carries the receptacle means between the stations. The receptacle means are filled with a precise amount of material, and preferably food products, under agitated conditions in the receiving station. The receptacle means are then conveyed to a discharge station wherein the precise amount of material is transferred to a packaging container. There are also contemplated means for substantially continuously moving the packaging containers during filling.

In my U.S. Pat. Nos. 2,978,231 and 3,217,760 I have disclosed machines for filling substantially rigid containers which comprise a rotary drum having a substantially horizontal axis of rotation. Through the drum and substantially parallel to its axis of rotation, containers such as cans, bottles or jars are conveyed under vibratory conditions. Elements such as rakes in the rotating drum pick up material and carry it around the inside of the drum. When the rakes have travelled to the upper part of the inside of the drum, the material drops off into the moving containers therebelow. The moving containers are subjected to a predetermined swinging or transverse motion during filling. By predetermination of the transverse motion of the containers, the amount of material entering the container is precisely controlled. Then the transverse motion applied to the containers causes the material to be delivered in a controlled manner until a desired amount of material is placed in the container. As a result, the container is filled to a precisely predetermined level.

In the patents referred to, a rotating drum is described which is adapted to receive the material to be placed in the containers. A conveyor moves the containers through the rotating drum in a longitudinal direction which is substantially parallel to the axis of rotation of the drum. Raking apparatus mounted within the drum adjacent the inner circumferential surface thereof combs and frees a portion of the material from the mass of material disposed adjacent to the lowest portion of the drum and advances the portion of material in response to the rotational movement of the drum. As the rakes engage and move the material, the material becomes untangled and the pieces of material are separated from one another so that they can be delivered into the containers.

Rotational movement of the drum advances the raking apparatus with the material engaged therein to a position where the material is released from the rakes and drops into the containers on the conveyor below. The elements of material having been advantageously separated and untangled from one another by the raking action fall toward and enter into the openings of the containers. My U.S. Pat. No. 2,978,231 describes one of the forms of the agitation required to fill the container to a predetermined precise quantity.

This invention is distinguished from filling packaging containers under agitated conditions while being passed through a rotating drum. In accordance with the apparatus and process, herein described, permanent receptacle means are precisely filled under agitated conditions while being passed through a rotating drum. In further distinction, the receptacle means are conveyed to a transfer station wherein the precise amount of material in the receptacle means is transferred to a receiving member. The receiving member such as a packaging container can be conveyed in register with the receptacle means.

In a preferred embodiment of the invention, the instant machine is synchronized with a packaging container-making machine so that the packaging containers are fed into the instant machine in synchronous relationship to the discharge of the material from the receptacle means.

In another embodiment of this invention, the receptacle means are agitated when in the discharge position in order to facilitate discharge of the material therefrom. Another embodiment comprises agitating means for the containers in order to help pack the material into the packaging containers.

BRIEF DESCRIPTION OF THE DRAWINGS

Various other objects and advantages of the present invention will be readily apparent from the following detailed description, when considered in connection with the accompanying drawings forming a part thereof, and in which:

FIG. 8 is a plan view of the machine of the invention showing the paths of travel of the buckets and the blade members;

DESCRIPTION OF THE PREFERRED EMBODIMENTS

Figure 1:
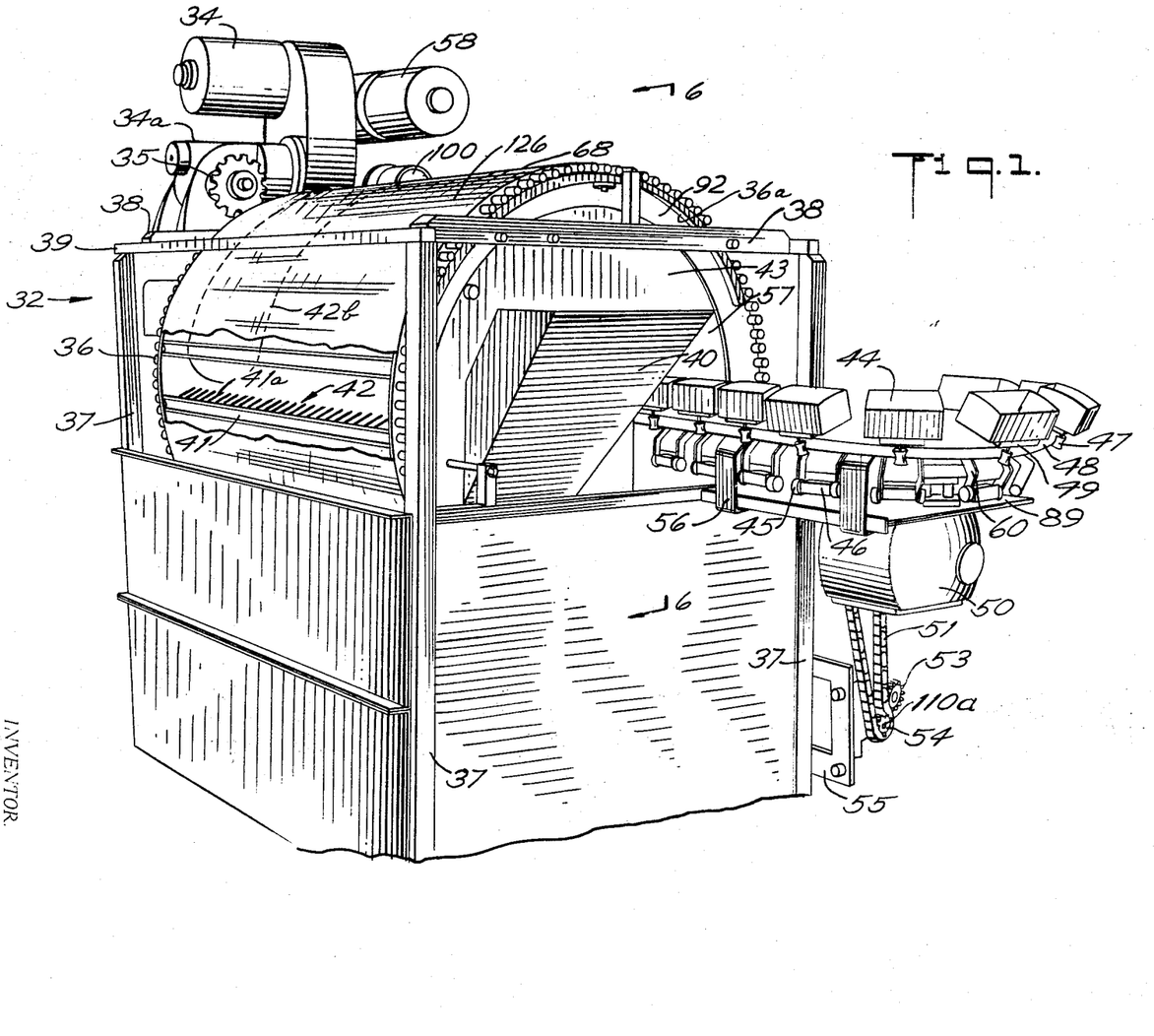
FIG. 1 is a perspective view showing the rotating drum, the plurality of buckets, and their conveyor.
Figure 2:
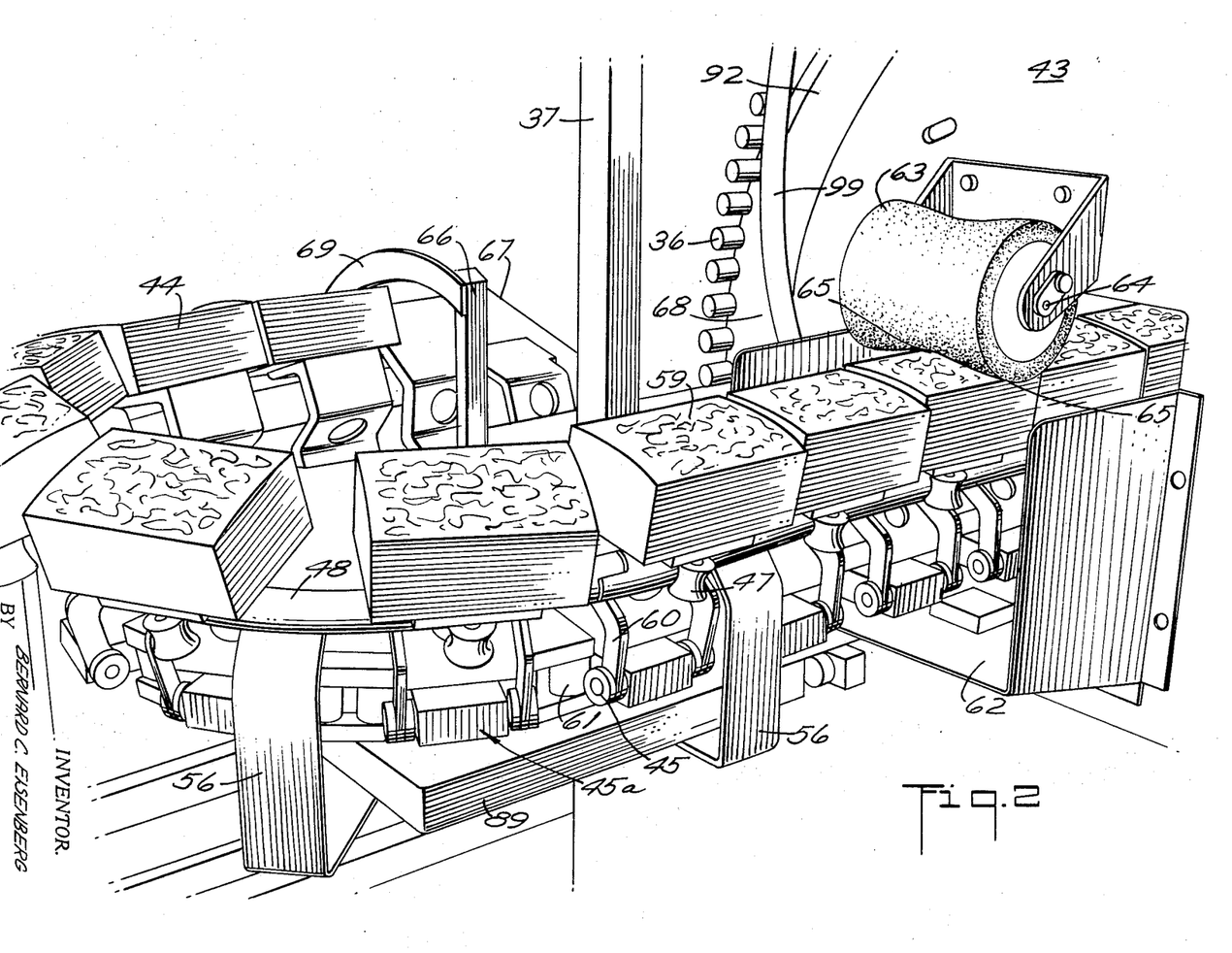
FIG. 2 is a fragmentary perspective view of the buckets emerging from the receiving station after being filled.
Figure 4:
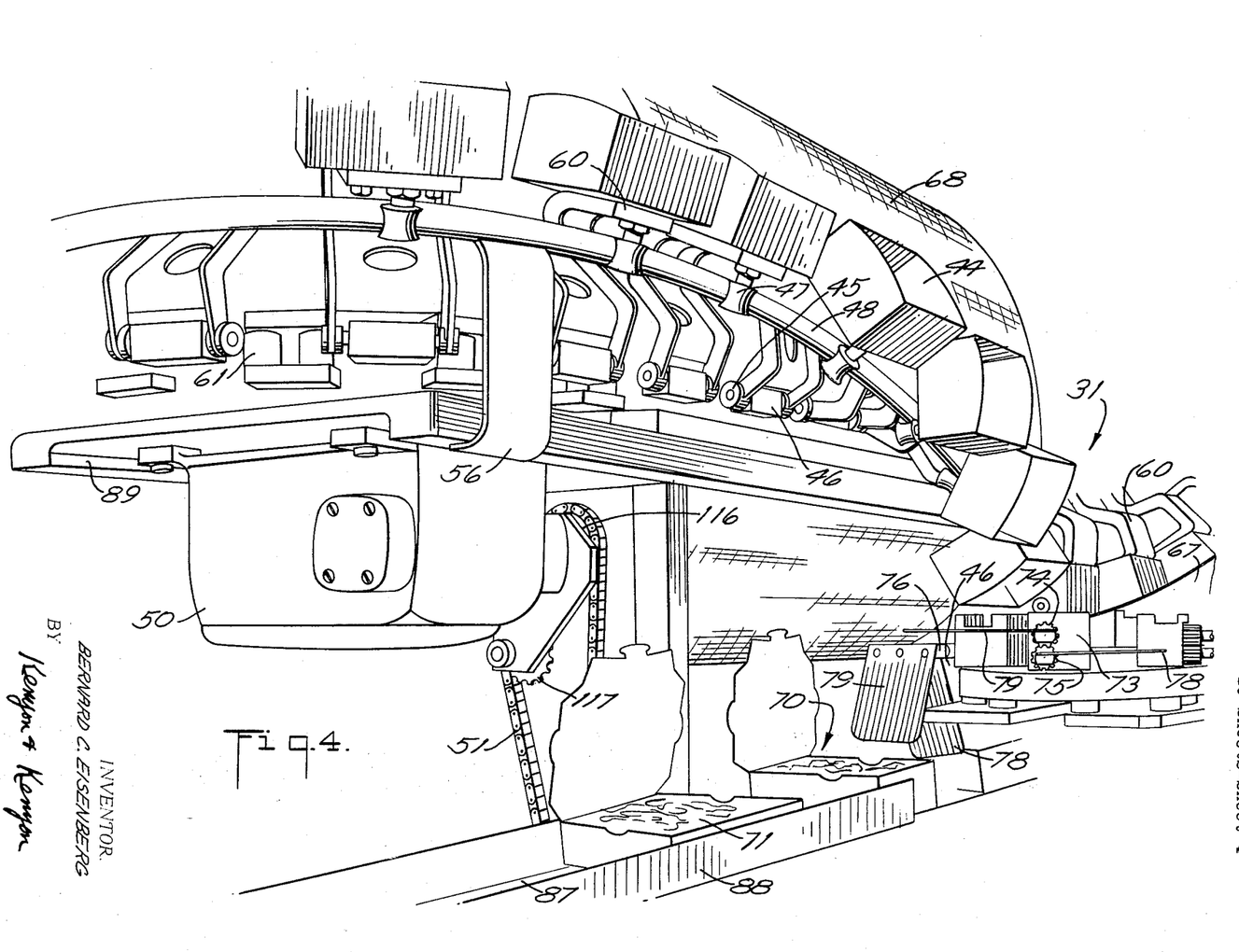
FIG. 4 is a fragmentary perspective view of the buckets after the discharge of the product into packaging containers.
Figure 5:
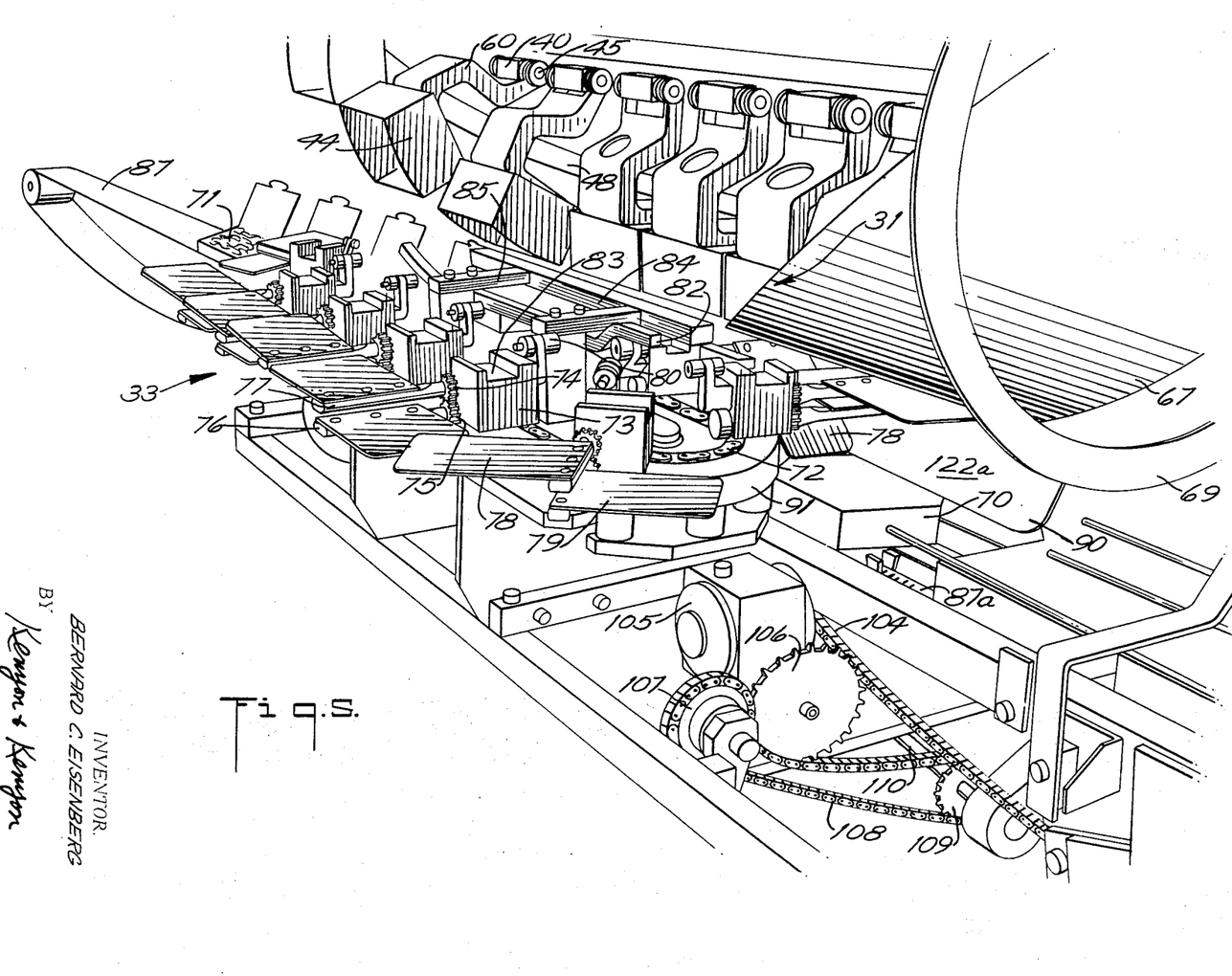
FIG. 5 is a fragmentary perspective view showing the blade members for advancing the containers and showing the inverted buckets at the discharge station.
Figure 6:
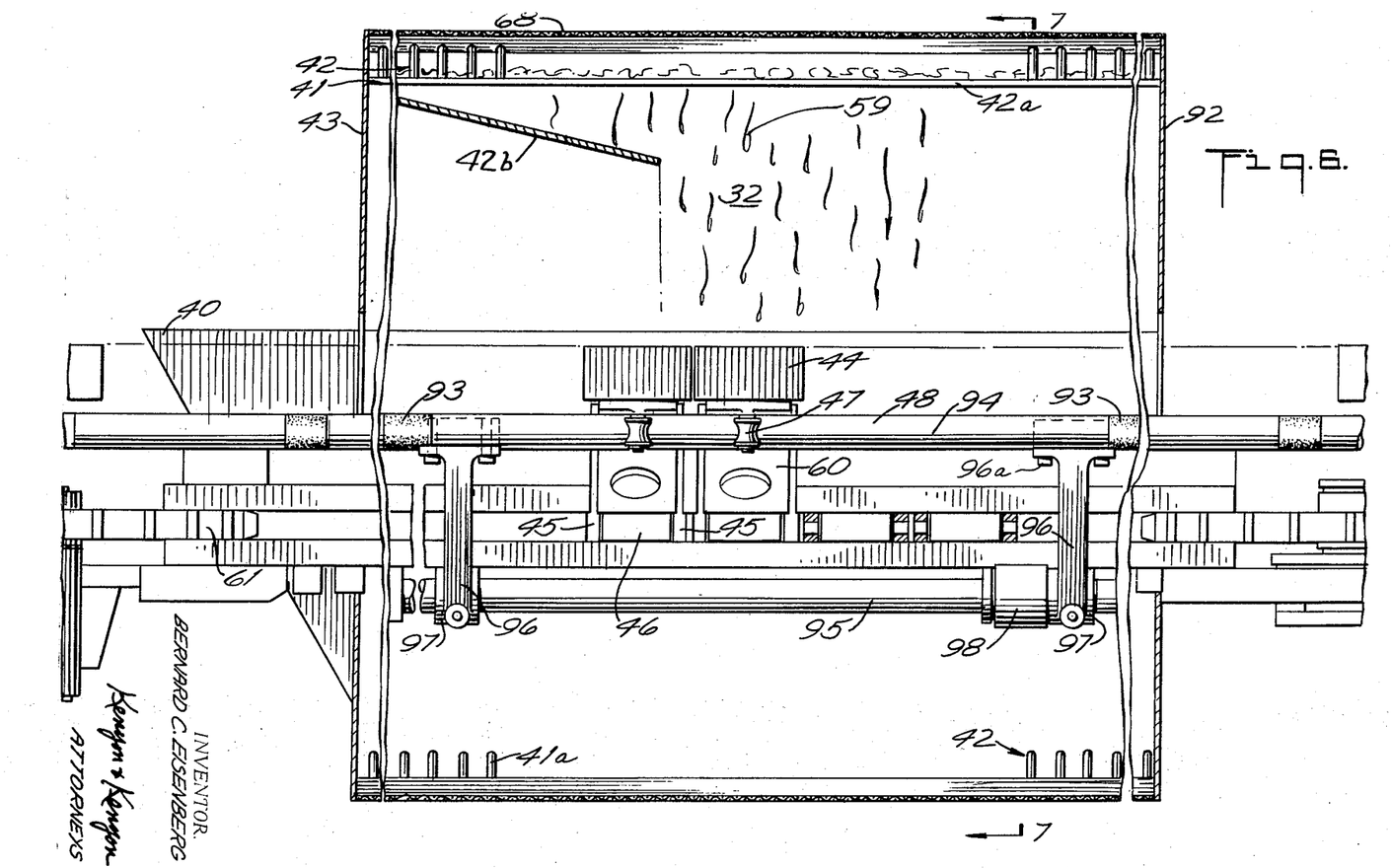
FIG. 6 is a vertical section view taken along the line 6—6 in FIG. 1 and showing the receiving station wherein material within the drum drops into the buckets.

FIGS. 1–6 show the general layout of the machine of the invention which includes discharge station 31 (FIGS. 4 and 5) and receiving station 32 (FIGS. 1 and 6). The container alignment mechanism is shown generally as numeral 33 in FIGS. 3 and 5. Receiving station 32 comprises rotating drum 68 which is supported by the roller engagement of rollers 36 on track 36a. Drum 68 is driven by motor 34 and drive 34a through sprocket 35 and rollers 36 (FIG. 1). Motor 34 is advantageously a variable speed motor which enables the speed of rotation to be selected in accordance with the operating conditions. Rotating drum 68 is supported in uprights 37 and beams 38 and 39 (FIG. 1). Drum 68 preferably has an open mesh jacket 126 extending axially along its circumference in order to facilitate the passage of liquids. Substantially parallel to the drum axis and adjacent jacket 126 are support rails 41 having inwardly protruding tines 41a secured thereon. Thus, the support rails and spaced tines form rakes 42. Drum ends are represented as stationary end plates 43 at the input and output ends 92 of the drum (FIGS. 1 and 2). Stationary end plate 43 comprises feed hopper 40 at the input end through which food products can be fed into the drum and opening 57 through which the conveying means hereinafter described enter the drum.

Material 59 (preferably a food product and herein illustrated as shredded spinach) is fed through feeder hopper 40 into the bottom portion of rotating drum 68. As the drum rotates, the rakes break up any clumps or wads of material and feed small quantities of the product on to a curved distribution pan or deflector plate 42a. Thus rakes 42 pick up the material (spinach) and move a portion thereof in a rotary direction with drum 68 until deposited by gravity on stationary deflector plate 42a (FIGS. 6 and 7) in the upper portion of drum 68. From plate 42a the material is dropped into the receptacle means, filling them gradually and continuously. Deflector 42b prevents the material from falling on buckets leaving the drum.

In place of the rakes, any of the material handling constructions shown in my U.S. patents for use within a rotating filling drum can be employed. Thus the drum can be fitted with the fixed buckets and chute of my U.S. Pat. No. 2,719,661, issued Oct. 4, 1955, the movable buckets and shaker pan of my U.S. Pat. No. 2,937,670, issued on May 24, 1960, or with the movable buckets and shaker pan of my U.S. Pat. No. 2,978,231, issued on Apr. 4, 1961.

The receptacle means are preferably buckets 44 (FIGS. 1–7) which are pivotally mounted at pivots 45 on shaft 123 through pivot arms 60. Pivots 45 are connected to support 45a which are attached to endless conveying chain 61 (FIGS. 2, 4, 6, 9 and 11). The interior surface 44a, of the buckets 44 may be provided with a means for preventing adherence of material thereto and thereby facilitate the release of material when the bucket reaches the discharge station. Buckets 44 ride along guide bar 48 by means of spools 47 which control the position of the buckets. It is readily understood that guide bar 48 is always at a constant distance from pivot connections 45. The position of guide bar 48 relative to pivot connection 45 determines the attitude of buckets 44, i.e., when the guide bar is above chain 61, the buckets are generally in an upright position, whereas, when the guide bar is below chain 61, the buckets are generally in an inverted position.

In order to fill buckets 44 with precise amounts of material 59, an agitating mechanism is secured onto section 94 (FIG. 6) of guide bar 48 within rotating drum 68. Motor 58 (preferably a variable speed motor) is connected to eccentric drive 100 (FIG. 1) which is coupled to arm 99 (FIG. 7), Lever 98 is pivotally connected to arm 99 and is rotatably mounted upon shaft 95 (FIG. 6). Secured to shaft 95 is lever 96 which is bolted to guide bar 48 at agitator section 94. Agitator section 94 of the guide bar is flexibly secured to the remainder of the guide bar at each end of the agitator action by a plurality of flexible sleeves 93. In agitator section 94, the outside diameter of the bar is selected to provide a substantially close fit with the rollers or spools 47 in order that the movement of the bar be directly transmitted to the bucket members. Beyond the agitator section but exclusive of portions 114b of guide bar 48, a looser fit between the guide bar and the buckets is preferably in order to reduce the drag of the spools with respect to the bar and in order to prevent binding as the buckets negotiate the curved reaches of the guide bar.

Shaking the buckets side-to-side at a controlled rate enables the buckets to be uniformly and accurately filled. The agitation of the bucket settles the material therein, eliminates voids within the buckets and minimizes the overhang of pieces of stringy material over the sides of the buckets. The agitation of the buckets results in uniform density of the material in the buckets and thereby uniform weight. Conventional machines have failed to accurately control weight since they fail to provide uniform density in the material being measured.

Figure 7:
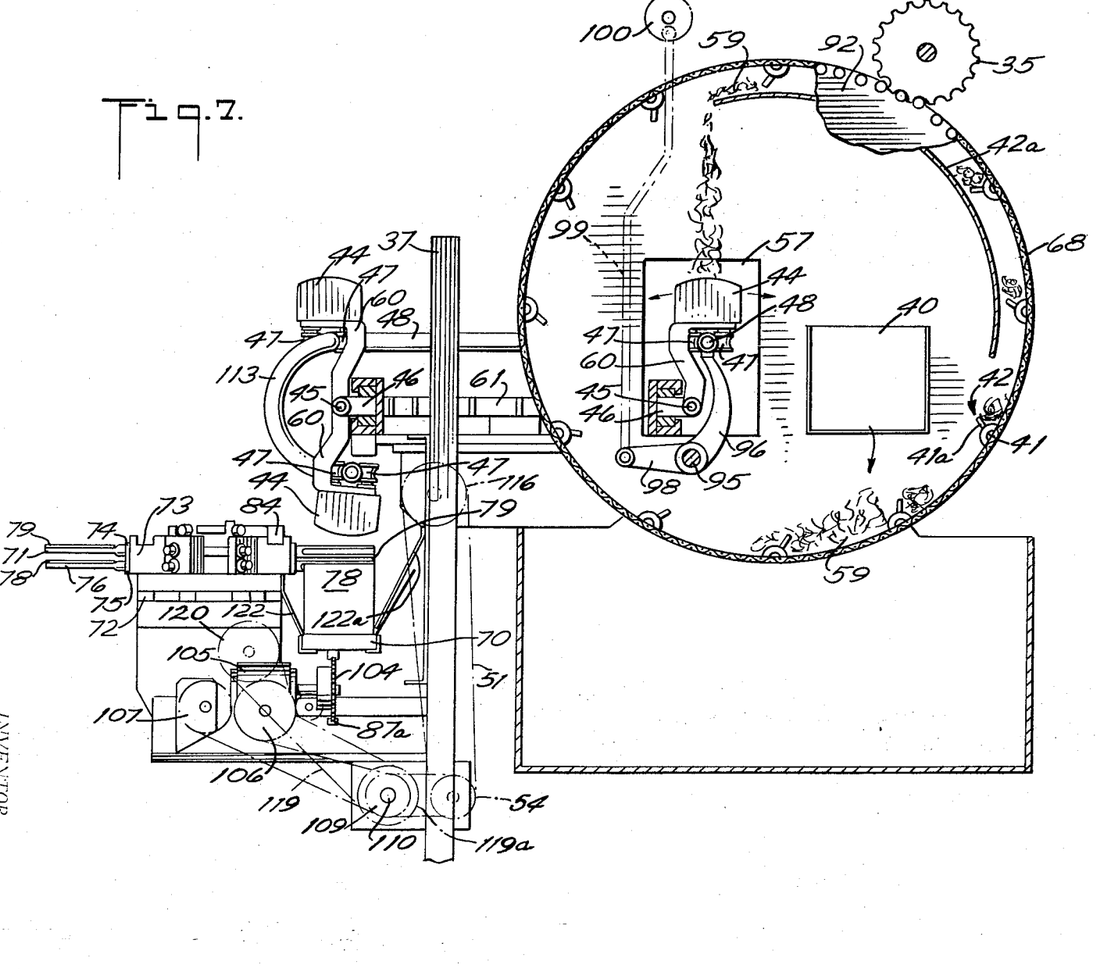
FIG. 7 is a vertical section view taken along the line 7—7 in FIG. 6 and showing the rotating drum delivering material into the buckets under agitating conditions at the receiving station and release of the material from the buckets to the packaging containers at the discharging station.

Endless conveying chain 61 travels in a closed continuous path about sprockets 112 as shown in FIG. 8. At receiving station 32 guide bar 48 is positioned above conveying chain 61. The guide bar 48 extends above conveying chain 61 until discharge station 31 (FIG. 7).

Figure 12:
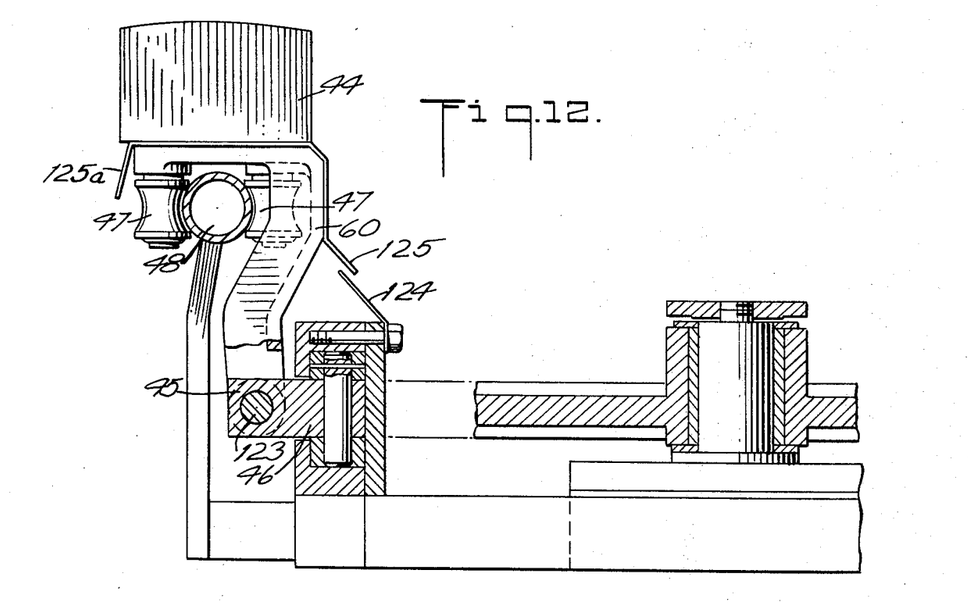
FIG. 12 is a fragmentary vertical section view of the guide bar.

With particular reference to FIG. 2 showing the output side of drum 68, the conveying means passes out of drum 68 through end plate opening 62. When the material being packed is stringy such as sauerkraut, spinach, etc., steam or air jets are employed to blow any ends of material overhanging the edges of the buckets back into the buckets. Steam or air jets issue from nozzles 63a which are positioned within the drum at each side of the bucket conveyor adjacent to the exit from the drum. The plurality of nozzles are directed upwardly within the drum. Roller 63 which is covered with resilient material and is mounted on adjustable mounting 64 serves to break or slice material overhanging the edges of buckets 44 at the location 65 where roller 63 intersects the buckets. The roller cuts material bridging the gap between adjacent buckets. If such material is not severed it can interfere with the proper discharge of the material from the buckets. To preclude any of the material carried by the buckets 44 from depositing on guide bar 48, deflector plates 124, 125 and 125a are provided (FIGS. 12, 13 and 15).

Figures 13, 15:
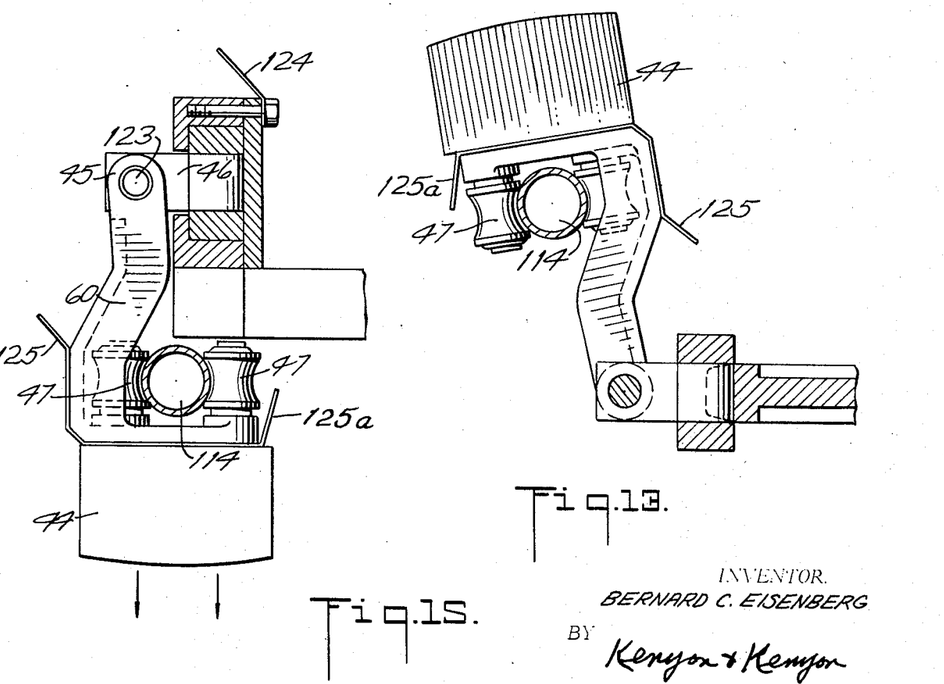
FIG. 13 is a fragmentary vertical section view of a bucket being pivoted as it is conveyed from the rotating drum.
FIG. 15 is a fragmentary vertical section view showing a bucket in the discharging position.
Figure 14:
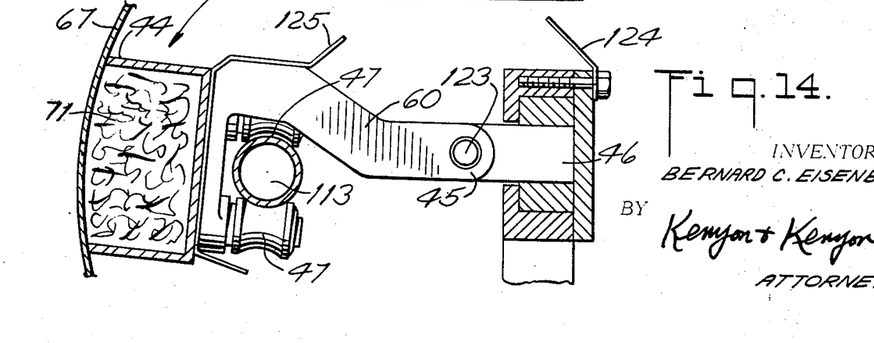
FIG. 14 is a fragmentary vertical section view of a bucket being pivoted prior to the transferring of the material therein at the discharging station.

During filling, bucket 44 is upright (FIG. 12), however, during movement about the curved portions 113 of guide bar 48 (FIG. 8); the buckets are tilted outwardly in order to provide sufficient clearance between their end portions (FIG. 13). At discharge station 31 guide bar 48 slopes downwardly and continues below conveying chain 61 until past discharge station 31 (FIG. 4). Buckets 44 are thereby pivoted to an upside-down attitude (FIG. 15). Guard 67 which is supported by frames 66 and 69 (FIG. 3) prevents premature discharge of material 59 from buckets 44 when being maneuvered into the inverted position. The curved surface of guard 67 is parallel with the downward sloping curve of guide bar 48 (FIG. 14). In the inverted position, material 59 is free to drop out of buckets 44 (FIG. 15). After discharge of materials 59, guide bar 48 reverses its downward direction and slopes upwardly at portion 113 of guide bar 48 (FIG. 8) until positioned above conveying chain 61, thereby turning buckets 44 back to the upright or erect attitude (FIGS. 4 and 5).

Figure 9:
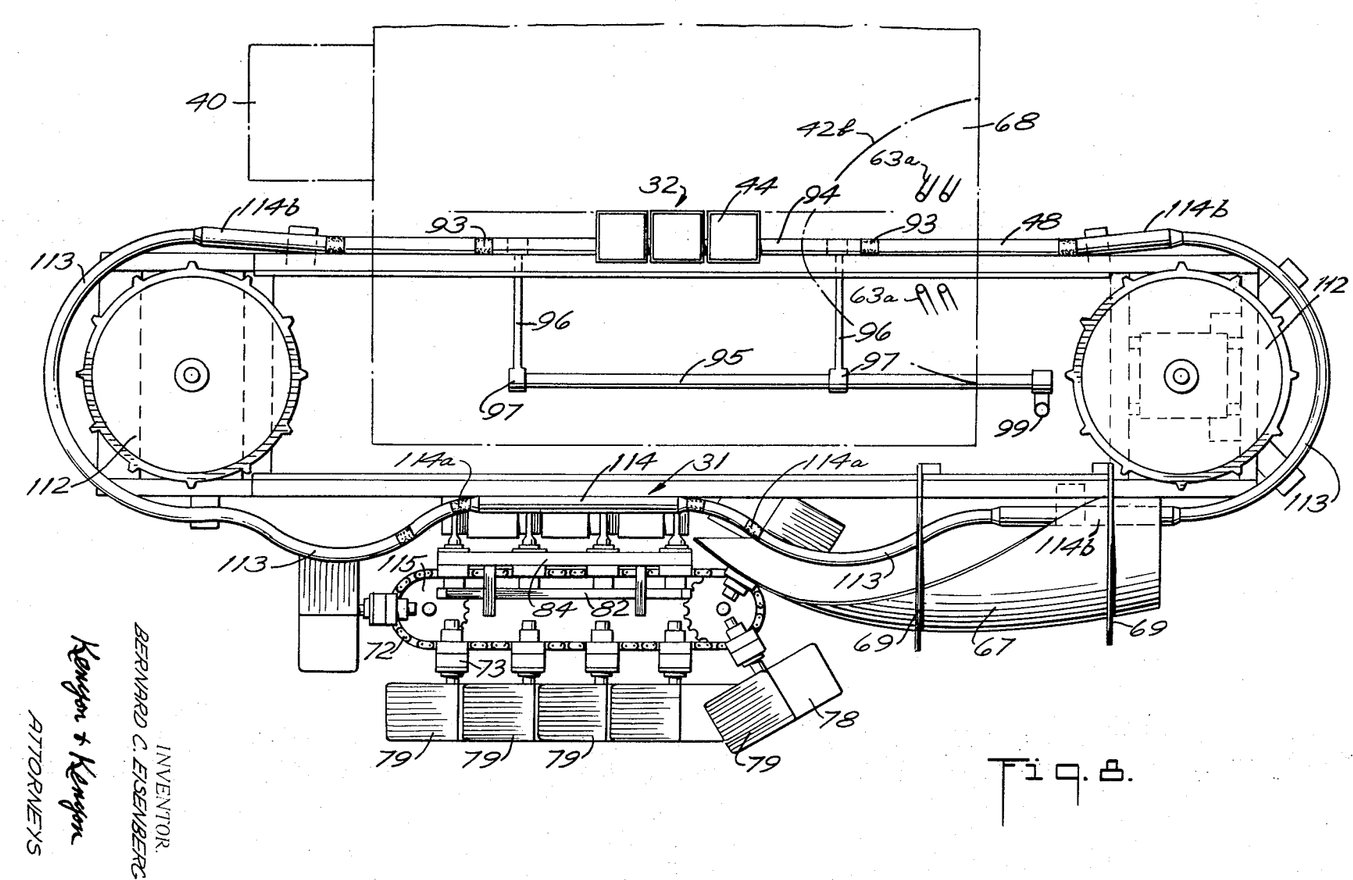
FIG. 9 is a fragmentary vertical section view showing the discharging station with an inverted bucket overlying the blade members.
Figure 10:
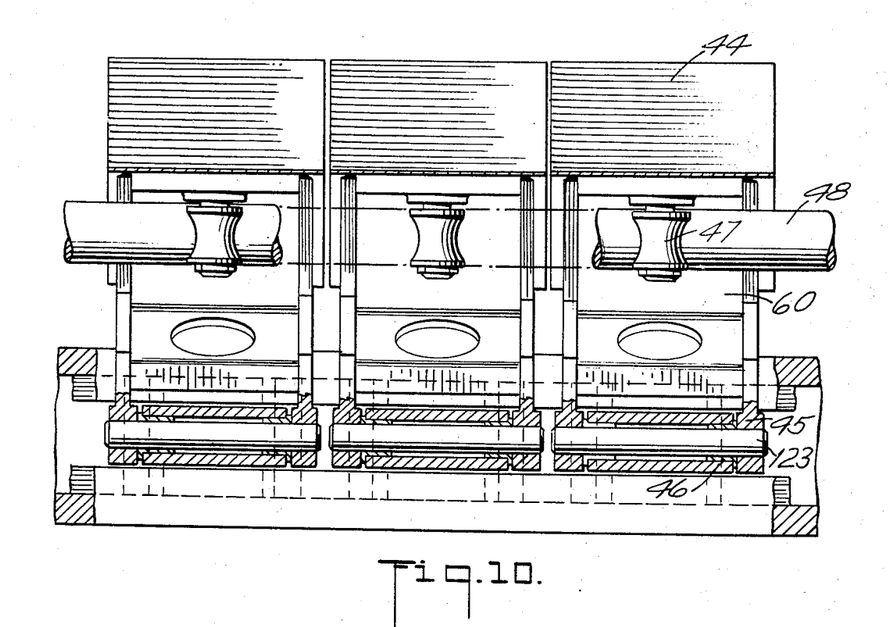
FIG. 10 is a fragmentary vertical section view taken along the line 10—10 in FIG. 9 and showing the buckets engaged to the guide bar.
Figure 11:
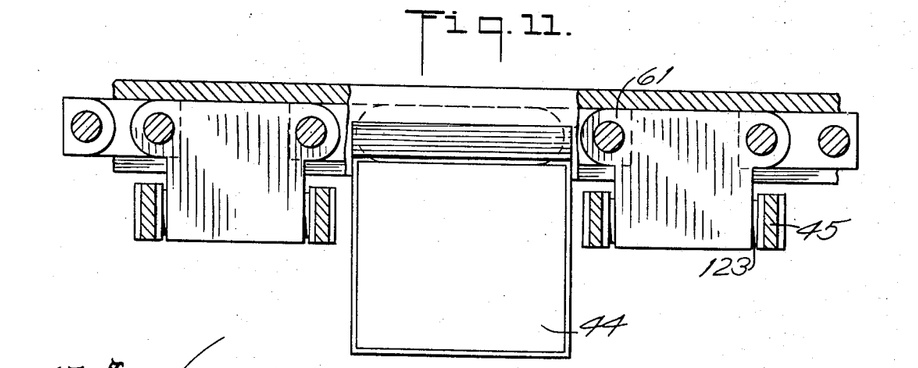
FIG. 11 is a fragmentary plan view showing a bucket mounted upon its conveyor chain.

Bucket conveying chain 61 is propelled by sprocket 112 (FIG. 8) which is driven by gear box 50 (FIGS. 1 and 4). The drive of gear box 50 includes sprockets 54 mounted on drive shaft 110a (FIGS. 1 and 9). Chain 51 which is tensioned by idler sprocket gear 53 (FIG. 1) provides the input to the gear box through gear 116. Plate 89 supports both gear box 50 and brackets 56 which in turn support the guide rod 48 (FIG. 2).

In the embodiment shown, it is necessary to synchronize the movement of containers 70 with conveying chain 61 in order to insure proper transfer of material 59 into the containers (FIGS. 4, 5, 7 and 17). Accordingly, drive shaft 110 (FIGS. 5 and 9) which is driven by a machine (not shown) for erecting cartons 70 is coupled to infeed conveyor 87 through sprocket 109, roller chain 108, sprocket gear 106, and gear box 105. Idler sprocket 107 defines one end portion of the reach of chain 108. The output of gear box 105 is transmitted by sprocket 104 to chain 87a of conveyor 87.

Figure 3:
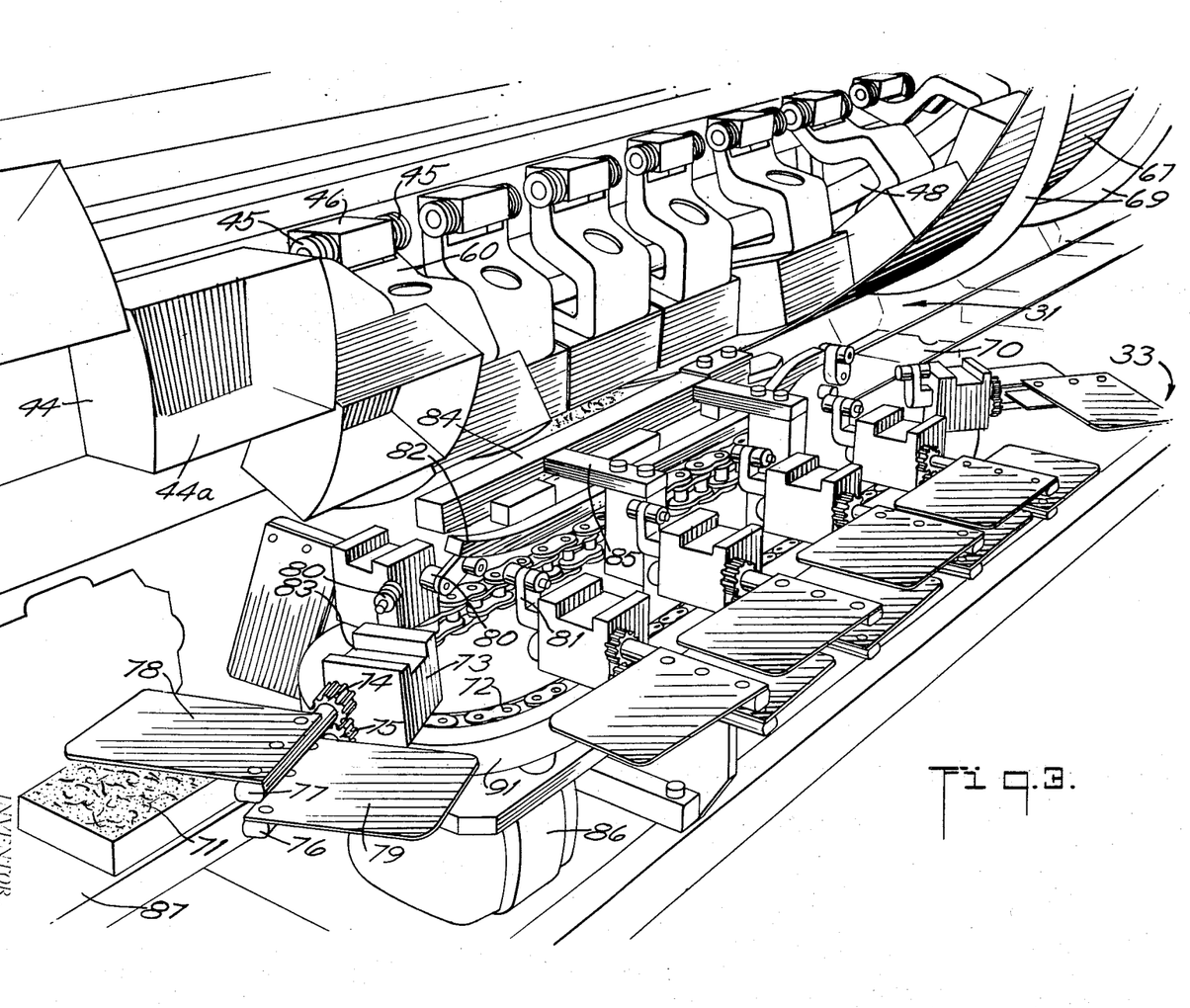
FIG. 3 is a fragmentary perspective view of the buckets adjacent the delivering station together with the packing container positioning mechanism.

Referring to FIGS. 3, 5 and 8, there is shown an apparatus 33 for positioning the leading and trailing end portions of a pair of containers adjacent to one another. The apparatus 33 comprises frame 91 supporting roller chain 72. Roller chain 72 is driven by gear box 86 (FIG. 3) which in turn is driven by sprocket 120. In order that the speed of sprocket chain 72 be equal to the speed of container conveyor 87, gear box 86 for driving chain 72 is connected by a chain drive 119 and sprocket 119a to shaft 110 as shown in FIGS. 7 and 9.

Figure 16:
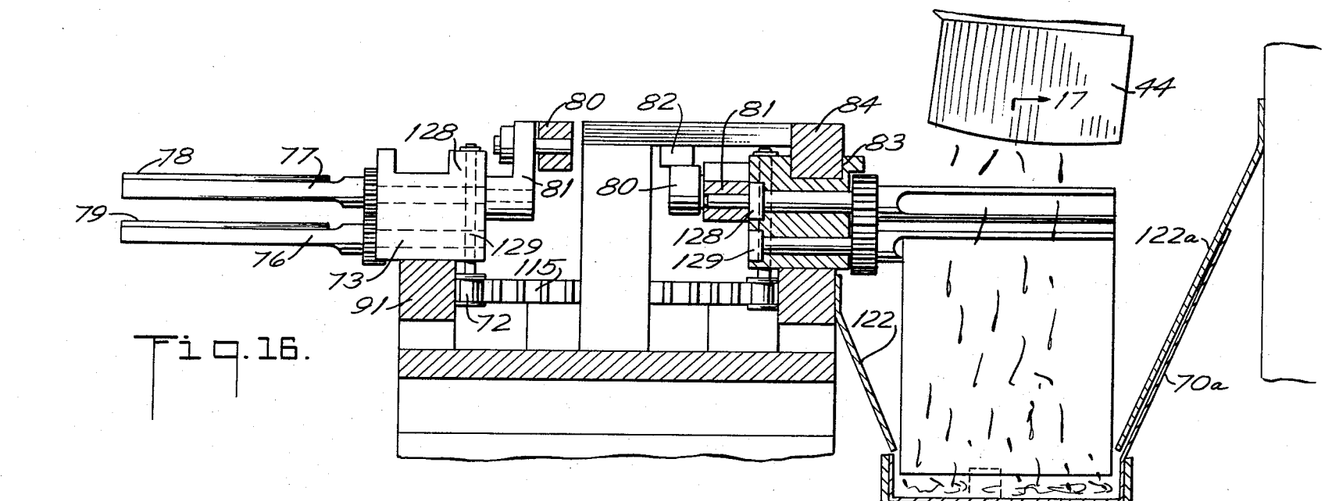
FIG. 16 is a fragmentary vertical section view showing the drives for raising and lowering the blade members with respect to the containers.

Mounting blocks 73 are driven in a closed loop by chain 72 (FIG. 3). Blocks 73 include slot 83 for engagement with aligning bar 84 (FIGS. 3, 5 and 16). Shafts 76 ant 77 having intermeshed gears 75 and 74 thereon are rotatably secured in each of blocks 73. Blades 78 and 79 are secured respectively to shafts 77 and 76. Follower 80 is secured to arm 81 mounted on an extension of shaft 77 as shown in FIG. 16. Follower 80 is normally biased in an upward position (as shown on the left side of FIG. 16) by a spring (not shown). When follower 80 is in the upright attitude, shafts 77 and 76 and blades 78 and 79 attached to said shafts are in a horizontal plane. When chain 72 has moved block 73 into engagement with aligning bar 84, as shown on the right side of FIG. 16, cam 82 interacts with follower 80 and depresses follower 80 to a downward position, thereby rotating shaft 77. Shaft 77 rotates shaft 76 through gears 74 and 75 so that blades 78 and 79 move to a downward (vertical) position as shown in FIG. 17.

Figure 17:
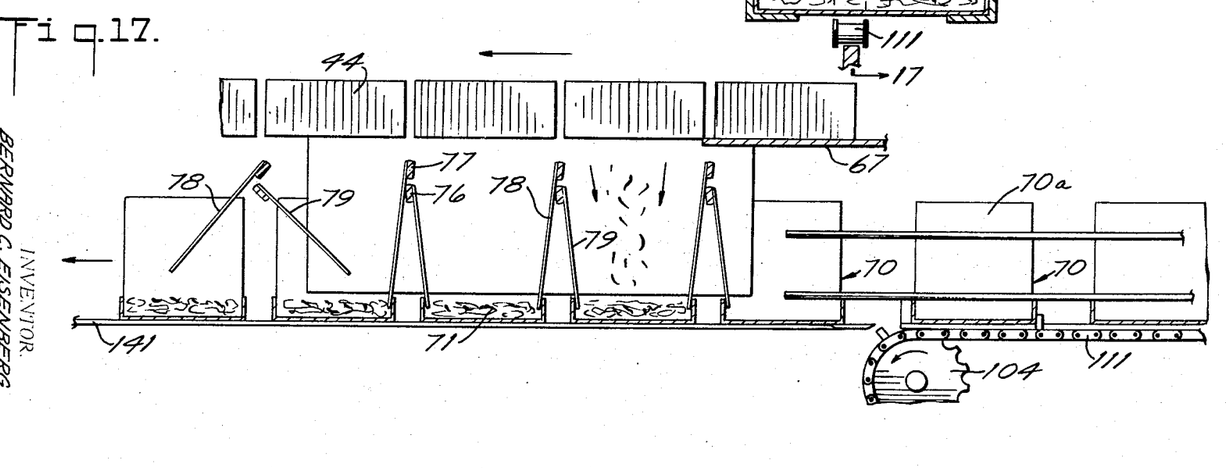
FIG. 17 is a fragmentary elevational view of the blade members positioned adjacent to the containers for guiding the material being discharged to pass into the containers.

As blades 78 and 79 approach a downward (vertical) position, the blades engage adjacent end walls of containers 70 and advance the trailing container toward the leading container (FIG. 17). Buckets 44 at this point travel beyond the end portion of guard 67 in the discharge position and thereby permit material 59 to fall into containers 70. Baffles 122 and 122a direct the material 59 into container 70 (FIG. 16). Baffle 122a also serves to hold cover 70a of carton 70 from interfering with the flow of material. After containers 70 are filled, the function of the baffles is completed. At this point, follower 80 moves from beneath cam 82 and thereby allows the follower and arm 81 to be biased toward the rest position. In this position, blades 78 and 79 resume a substantially horizontal position.

Figure 18:
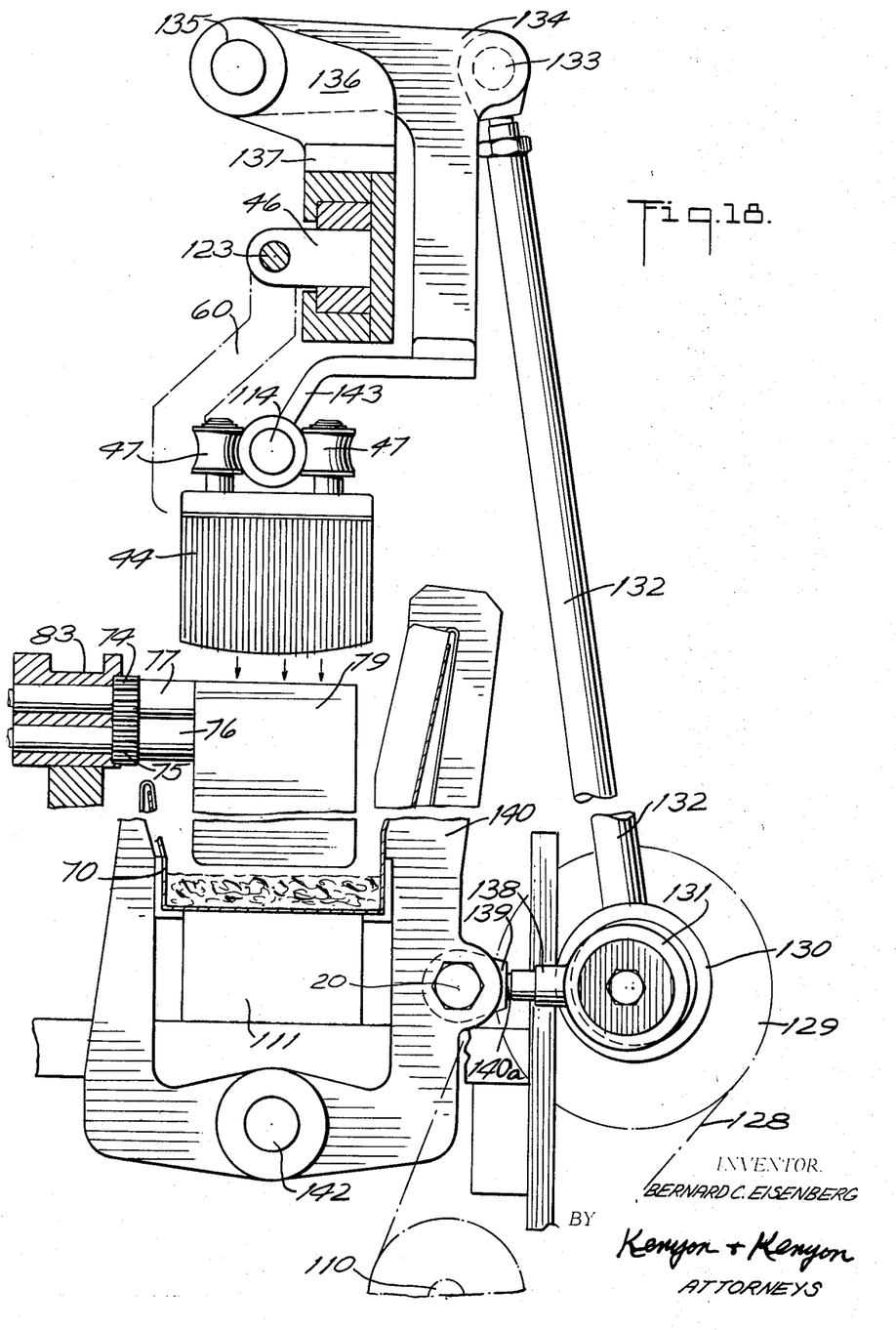
FIG. 18 is a fragmentary elevational view of a drive for shaking the bucket as well as the container conveyor at the discharging station.

FIG. 18 illustrates an embodiment of the invention wherein an agitating mechanism is provided at the discharging station to facilitate discharge of the material from the receptacle means into the packaging containers. Drive chain 128 which is driven from drive shaft 110 drives sprocket 129 which is coupled to eccentrics 130 and 131. Rotation of the eccentrics 130 and 131 move rods 132 and connector arm 138, respectively in a reciprocating motion. Rod 132 is pivotally connected by rod end 133 to arm 134 which in turn is pivotally connected to shaft 135 extending through hanger 136. Hanger 136 supports track 137 which carries chain 61. Arm 134 is also connected by bracket 143 to guide bar 114 which is that portion of guide bar 48, which is agitated in discharge station 31. The portion of guide bar 114 which is agitated in the discharge station is connected to the remainder of the guide bar by flexible sleeves 114a as in the rotating drum (FIG. 8).

Connector arm 138 is pivotally connected by rod end 139 to pin 140a of yoke 140. The yoke is pivotally mounted about shaft 142. The swinging motion of yoke 140 is imparted to conveyor 141 and thereby to cartons 70. In this way the discharge of materials from buckets 44 and the settling of the material into the cartons is insured.

OPERATION

The material to be transferred in predetermined amounts by the machine of the invention is admitted to the interior of rotating drum 68 by means of hopper 40 (FIG. 1). The drum is driven in rotation and as a result rakes 42 carry the material from the bottom portion of the drum to curved plate 67 adjacent the top portion of the drum (FIG. 6). As the rakes carry the material beyond the upper extremity of the curved plate, the material falls toward the path of travel of buckets 44 (FIGS. 6 and 7). The speed of rotation of the drum is selected to control the rate of delivery of the material adjacent to the path of travel of the buckets.

Buckets 44 are each pivotally attached by arm 60 to conveyor chain 61 which has a path of travel extending in part through the drum. The path of travel of the conveyor chain is substantially parallel to the axis of rotation of the drum. The buckets are positioned along the path of travel of the conveyor chain by means of guide bar 48 which is engaged by spools 47 rotatably mounted with respect to the buckets.

In order to insure that the buckets are filled with a predetermined amount of material during their passage through the rotating drum, the guide bar and thereby the buckets are subjected to a predetermined motion in order to agitate the buckets. As in the case of the speed of rotation of the drum, the motion applied to the buckets by means through the guide bar can be controlled. In this way the frequency and amplitude of the agitation of the buckets enables the amount of material received by the buckets to be precisely controlled.

As the buckets filled with material advance out of the rotating drum, the upper portion of each of the buckets is engaged by resilient roller 63 in order to shear away any material which may hang over the side portions of the buckets (FIG. 2). The filled buckets are then conveyed around a curved portion of the conveyor for approximately 180° and as the curved portion terminates, the buckets are inverted in response to the control of the guide bar (FIG. 3). Curved plate 67 engages the upper portion of the buckets as they are inverted in order to prevent the material within the buckets from being discharged prematurely.

In the case where the machine of the invention is to be employed to fill containers such as cartons 70, the cartons are erected by a separate machine disposed adjacent to the transfer machine of the invention. The machine for erecting the cartons is synchronized with the transfer machine so that a carton is delivered for every bucket of the machine moving past the discharge station. Conveyor chain 87 delivers the erected cartons to adjacent discharge stations 31 (FIG. 5).

At the discharge station the material is transferred from the buckets to the cartons as the buckets leave plate 67 (FIG. 17). In order to insure that the cartons are in alignment with the buckets and to direct the material from the buckets into the cartons, a conveyor chain 72 having blade members 78 and 79 is disposed adjacent to the discharge station (FIGS. 3 and 16). Conveyor chain 72 drives blocks 73 from which extend the pivotally mounted blade members. Conveyor 72 is driven in synchronism with the conveyor for the buckets. By means of followers 80 and cam 82, blade members 78 and 79 attached to shafts 77 and 76 are turned downwardly toward one another and into engagement with the trailing end portion and the leading end portion of adjacent cartons. As a result, the cartons are positioned in an underlying position with respect to the inverted buckets. The blade members also serve to form deflecting surfaces for directing the material into the cartons.

If there is a tendency for the material being transferred to cling to the interior surface of bucket 44, the bucket can be agitated in the inverted position by means of the agitating mechanism secured to guide bar 114 shown in FIG. 18. If there is need to agitate the cartons in the discharge station in order to facilitate the entry of the material into the interior of the carton, tracks 141 supporting the containers can be agitated by yoke 140 shown in FIG. 18.

Beyond the discharge station blade members 78 and 79 are elevated away from the cartons so that the filled cartons can be conveyed from the transfer machine. At the exit end of the discharge station, guide bar 114 directs the inverted buckets through an approximately 180° movement to an upright position. In this way the buckets are prepared to reenter the rotating drum and to receive a new fill of material.

Where the amount of material to be transferred is to be changed, the transfer machine is adjusted by changing the size of the buckets attached to conveyor chain 61. Changes in the material are compensated for by selecting the rate of rotation of the drum and the frequency and displacement of the buckets as they travel through the drum. Similarly, where the buckets and cartons are agitated in the discharge station the frequency and displacement are selected in accordance with the material being transferred.

What is claimed is:

1. A machine for transferring predetermined amounts of materials from a receiving station to a discharging station comprising:
   (a) a plurality of receptacle means for receiving material to be transferred;
   (b) means for conveying said plurality of receptacle means with respect to the machine in a path extending between the receiving station and the discharging station;
   (c) means disposed adjacent to the receiving station and enclosing a portion of said plurality of receptacle means along the path of said conveying means for receiving material to be transferred, said portion including a number of said receptacle means disposed adjacent to one another;
   (d) means disposed within said receiving means for delivering a flow of material simultaneously to said portion of said plurality of receptacle means.
   (e) means for moving said portion of said plurality of receptacle means within said receiving means with a predetermined motion in order to agitate the material therein and establish a precise predetermined amount of material received therein from said directing means; and
   (f) means disposed adjacent to said path and downstream of the receiving station for discharging the predetermined amount of material from said receptacle means.

2. A machine in accordance with claim 1 in which said plurality of receptacle means comprises a plurality of buckets mounted on said conveying means, said buckets each having an interior portion for receiving material from said delivering means.

3. A machine in accordance with claim 2 in which the interior portion of each of said buckets includes means for preventing adherence of material thereto in order to facilitate the release of material from said interior portion at the discharging station.

4. A machine in accordance with claim 3 in which said means for preventing adherence of material to said interior portion of each of said buckets includes the provision of an inner surface for each of said buckets of material adapted to reduce surface tension with respect to material adjacent thereto.

5. A machine in accordance with claim 3 in which said means for preventing adherence of material to the said interior portion of each of said buckets includes a texturing of the surface of said interior portion.

6. A machine accordance with claim 1 in which said means for conveying said receptacle means comprises an endless drive element.

7. A machine in accordance with claim 6 in which said endless drive element comprises an endless chain.

8. A machine in accordance with claim 1 and further comprising means for maintaining material within said receptacle means in advance of the discharging station comprising a plate member having a surface formed to mate and cover the entrance portion of said receptacle means as said receptacle means are conveyed toward the discharging station.

9. A machine in accordance with claim 1 and further comprising:
   (a) means for transporting containers to adjacent said means for discharging the predetermined amount of material from said receptacle means to receive the material therefrom; and
   (b) means for agitating said transporting means to insure the filling of the containers thereon.

10. A method for transferring predetermined amounts of materials from a receiving station to a discharging station by a plurality of receptacle means for receiving material to be transferred comprising the steps of:
    (a) conveying the plurality of receptacle means in a path extending between the receiving station and the discharging station;
    (b) enclosing a portion of the conveying path between the receiving and discharging stations;
    (c) providing a supply of material;
    (d) delivering a flow of the material directly from the supply so that it may be directed to the receptacle means;
    (e) directing the flow of material simultaneously to a portion of the plurality of receptacle means adjacent the receiving station, the portion including a number of said receptacle means disposed adjacent to one another;
    (f) moving the portion of receptacle means while in the enclosed portion of the conveying path with a predetermined motion in order to agitate the material therein and establish a precise predetermined amount of material received therein during the step of delivering; and
    (g) discharging the predetermined amount of material from said receptacle means at the discharging station downstream of the receiving station.

11. A method in accordance with claim 10 and further comprising the steps of:
    (a) advancing containers to the discharging station to receive the predetermined amounts of material being discharged from the receptacle means;
    (b) engaging the trailing end portion of a leading container and the leading end portion of a trailing container as the containers are advanced;
    (c) moving at least one of the leading containers and the trailing containers relative to the other to place the trailing and leading end portions respectively thereof adjacent to one and another and substantially in alignment with the receptacle means as the containers are advanced; and
    (d) conveying the pair of leading and trailing containers with the trailing and leading end portions respectively thereof adjacent one another at a velocity corresponding to that of the receptacle means at the discharging station.

12. A method in accordance with claim 11 in which the step of moving at least one of the leading container and the trailing container relative to the other comprises accelerating the trailing container toward the leading container to place the leading end portion of the trailing container adjacent to the trailing end portion of the leading container.

13. A method in accordance with claim 11 and further comprising the step of providing a passage extending between the end of the receptacle means and each container in the discharging station to direct the discharge of the predetermined amount of material into the interior of the container.

14. A machine for transferring predetermined amounts of materials from a receiving station to a discharging station comprising:
   (a) a plurality of buckets for receiving material to be transferred;
   (b) means for conveying said plurality of buckets with respect to the machine in a path extending between the receiving station and the discharging station;
   (c) means disposed adjacent to the receiving station for delivering material simultaneously to a portion of said plurality of buckets;
   (d) means for moving said portion of said plurality of buckets with a predetermined motion in order to agitate the material therein and establish a precise predetermined amount of material received therein from said delivery means;
   (e) means disposed adjacent to said path and downstream of the receiving station for discharging the predetermined amount of material from said buckets;
   (f) said buckets being mounted on said conveying means and each having an interior portion for receiving material from said delivering means; and
   (g) means for pivotally mounting each of said plurality of buckets with respect to said conveying means for movement between an erected position for receiving and transferring the material and an inverted position for discharging the material.

15. A machine for transferring predetermined amounts of materials from a receiving station to a discharging station comprising:
   (a) a plurality of receptacle means for receiving material to be transferred;
   (b) means for conveying said plurality of receptacle means with respect to the machine in a path extending between the receiving station and the discharging station;
   (c) a drum having a longitudinal axis extending substantially in a horizontal direction, the interior of said drum being adapted to contain the material to be delivered, said drum enclosing within the interior thereof a portion of said path of said conveyor means adjacent the receiving station and which extends therethrough;
   (d) means disposed within said drum for directing material into a substantial portion of said receptacle means in said drum;
   (e) means for rotating said drum about the longitudinal axis thereof to lift material from the bottom portion of the interior of said drum to said directing means in response to the rotational movement of said drum;
   (f) means for moving said portion of said plurality of receptacle means with a predetermined motion in order to agitate the material therein and establish a precise predetermined amount of material received therein; and
   (g) means disposed adjacent to said path and downstream of the receiving station for discharging the predetermined amount of material from said receptacle means.

16. A machine in accordance with claim 15 in which said means for directing material into said receptacle means comprises:
   (a) rake means mounted adjacent to the inner circumferential surface of said drum for conveying material from the lower portion to the upper portion of said drum in response to the rotation thereof; and
   (b) a plate member stationarily mounted within the upper portion of said drum and extending horizontally to a position overlying the path of travel of said receptacle means, said plate member being adapted to receive material from said rake means and direct the material toward said receptacle means.

17. A machine in accordance with claim 15 in which said means for discharging the predetermined amount of material from said receptacle means comprises means for inverting said movably mounted receptacle means adjacent the discharging station to discharge the material therefrom.

18. A machine in accordance with claim 17 in which said means for inverting said movably mounted receptacle means comprises a guide bar having a portion directed to a position at which said receptacle means which are engaged for relative movement with said guide bar and pivotally mounted to said conveying means are moved to an inverted position.

19. A machine in accordance with claim 15 wherein said means for moving said receptacle means with a predetermined motion comprises:
   (a) means for pivotally mounting said receptacle means with respect to said conveying means;
   (b) a movable guide bar disposed in said rotatable drum and extending substantially parallel to the path of travel therethrough of said conveying means, said receptacle means being engaged to said guide bar for relative motion therewith;
   (c) means for applying a shaking movement to said guide bar, the shaking movement applied to said guide bar shaking said receptacle means engaged thereto;

whereby the movement of the guide bar causes said receptacle means to move pivotally with respect to said conveying means.

20. A machine for transferring predetermined amounts of materials from a receiving station to a discharging station comprising:
   (a) a plurality of receptacle means for receiving material to be transferred;
   (b) means for conveying said plurality of receptacle means with respect to the machine in a path extending between the receiving station and the discharging station;
   (c) means disposed adjacent to the receiving station for delivering material simultaneously to a portion of said plurality of receptacle means;
   (d) means for moving said portion of said plurality of receptacle means with a predetermined motion in order to agitate the material therein and establish a precise predetermined amount of material received therein from said delivery means;
   (e) means disposed adjacent to said path and downstream of the receiving station for discharging the predetermined amount of material from said receptacle means;
   (f) means for transporting containers along a line of travel extending adjacent to the discharging station, the trailing edge of one container being spaced apart from the leading edge of the container following with respect thereto;
   (g) at least one pair of blade members;
   (h) means for advancing said pair of blade members along another path of travel with a portion thereof extending adjacent and substantially parallel to the line of travel of the containers, said advancing means moving at a velocity substantially corresponding to that of said conveying means, said pair of blade members being pivotally mounted upon said advancing means about an axis extending therefrom at right angles to the other path of travel of said advancing means for movement between a position in which said blade members extend oppositely away from one another substantially parallel to the line of travel of the containers to another position in which said blade members are facing and adjacent to one another and extend substantially at right angles to the line of travel of the containers, the free end portions of said blade members disposed opposite said pivotal mounting thereof being adapted to extend within said containers in a facing relationship with the leading and trailing end portions therebetween; and (i) means for moving said blade members between said position and said other position;

whereby said blade members are adapted to move the containers in synchronism with said receptacle means.

21. A machine in accordance with claim 20 in which means are connected to said pivotally mounted blade members for urging one of said pair of blade members to move opposite the other of said pair of blade members and in which said means for moving said blade members between said position and said other position includes cam means operatively connected to at least one of said pair of blade members.

22. A machine in accordance with claim 20 and further comprising means for resiliently biasing said blade members to said position in which said blade members extend oppositely away from one another.

23. A machine for transferring predetermined amounts of materials from a receiving station to a discharging station comprising:
 (a) a plurality of receptacle means for receiving material to be transferred;
 (b) means for conveying said plurality of receptacle means with respect to the machine in a path extending between the receiving station and the discharging station;
 (c) means disposed adjacent to the receiving station for delivering material simultaneously to a portion of said plurality of receptacle means;
 (d) means for moving said portion of said plurality of receptacle means with a predetermined motion in order to agitate the material therein and establish a precise predetermined amount of material received therein from said delivery means;
 (e) means disposed adjacent to said path and downstream of the receiving station for discharging the predetermined amount of material from said receptacle means;
 (f) a movable guide rail extending through the discharging station, said receptacle means being engaged to said rail for relative motion therewith, and
 (g) means for applying an agitating movement to said guide rail, the agitating movement applied to said guide rail agitating said receptacle means engaged thereto,
whereby the movement of the guide rail causes said receptacle means to move pivotally with respect to said conveying means at the discharge station.

24. A method for transferring predetermined amounts of materials from a receiving station to a discharging station by a plurality of receptacle means for receiving material to be transferred comprising the steps of:
 (a) conveying the plurality of receptacle means in a path extending between the receiving station and the discharging station;
 (b) delivering material simultaneously to a portion of the plurality of receptacle means adjacent the receiving station;
 (c) moving the portion of receptacle means with a predetermined motion in order to agitate the material therein and establish a precise predetermined amount of material received therein during the step of delivering;
 (d) discharging the predetermined amount of material from said receptacle means at the discharging station downstream of the receiving station; and
 (e) maintaining the receptacle means between an erected position for receiving and transferring the material in an inverted position for discharging the material.

25. A method in accordance with claim 24 in which the step of delivering material to the receptacle means comprises:
 (a) conveying the receptacle means through a drum having a longitudinal axis extending substantially in a horizontal direction, the interior of said drum being adapted to contain the material to be delivered, the drum enclosing within the interior thereof a portion of said path of the receptacle means adjacent the receiving station;
 (b) rotating the drum about the longitudinal axis thereof to lift material from the bottom portion of the interior of said drum to above the receptacle means in response to the movement of the drum; and
 (c) directing the material toward the receptacle means adjacent the receiving station.

26. A method in accordance with claim 24 in which the step of discharging the material from the receptacle means comprises inverting the receptacle means adjacent the discharge station to discharge the material therefrom.

References Cited

UNITED STATES PATENTS

| | | | |
|---|---|---|---|
| 2,236,857 | 4/1941 | Railton | 222—371 X |
| 2,620,958 | 12/1952 | Messina | 141—133 |
| 2,815,046 | 12/1957 | McBean et al. | 141—79 |
| 2,888,962 | 6/1959 | Ammon | 222—197 X |
| 2,978,231 | 4/1961 | Eisenberg | 141—78 X |
| 3,045,720 | 7/1962 | Jungmayr et al. | 222—371 X |
| 3,285,294 | 11/1966 | Minera | 141—1 |
| 3,314,454 | 4/1967 | Wood | 141—72 |

OTHER REFERENCES

German printed application, 1,101,288, March 1961.

LAVERNE D. GEIGER, Primary Examiner

E. J. EARLS, Assistant Examiner

U.S. Cl. X.R.

141—78, 131, 144; 198—179; 222—167, 197